United States Patent [19]

Molter et al.

[11] Patent Number: 4,818,637
[45] Date of Patent: Apr. 4, 1989

[54] HYDROGEN/HALOGEN FUEL CELL WITH IMPROVED WATER MANAGEMENT SYSTEM

[75] Inventors: Trent M. Molter, Enfield, Conn.; Anthony B. LaConti, Lynnfield, Mass.

[73] Assignee: United Technologies Corporation, Hartford, Conn.

[21] Appl. No.: 196,527

[22] Filed: May 20, 1988

[51] Int. Cl.$^4$ .......................... H01M 8/04; H01M 8/10
[52] U.S. Cl. .......................................... 429/15; 429/30; 429/17
[58] Field of Search .............................. 429/15, 17, 30

[56] References Cited

U.S. PATENT DOCUMENTS

| | | | |
|---|---|---|---|
| 4,222,873 | 9/1980 | Matsumura | 429/17 X |
| 4,320,129 | 3/1982 | Hart | 429/17 X |
| 4,343,868 | 10/1982 | Putt | 429/17 |
| 4,530,886 | 7/1985 | Sederquist | 429/13 |
| 4,649,091 | 3/1987 | McElroy | 429/26 X |

OTHER PUBLICATIONS

1979 Article by R. S. Yeo and J. McBreen, "Transport Properties of Nafion Membranes in Electrochemically Regenerative Hydrogen/Halogen Cells".

1979 Article by R. S. Yeo, J. McBreen, A. C. C. Tseung, S. Srinivasan and J. McElroy, "An Electrochemically Regenerative Hydrogen-Chlorine Energy Storage System: Electrode Kinetics and Cell Performance".

Primary Examiner—Stephen J. Kalafut

[57] ABSTRACT

The present invention discloses an improved method for operating a conventional solid polymer electrolyte membrane hydrogen/halogen fuel cell. The improvement comprises humidifying the hydrogen gas prior to it entering the anode chamber thereby providing additional water to be protonically pumped through the membrane to the cathode where it dilutes the acid produced by the cathodic reaction.

4 Claims, 4 Drawing Sheets

HYDROGEN/HALOGEN FUEL CELL WITH IMPROVED WATER MANAGEMENT SYSTEM

CROSS REFERENCE TO RELATED APPLICATIONS

This application relates to U.S. application Ser. No. 076,970 for High Power Density Evaporatively Cooled Ion Exchange Membrane Fuel Cell by J. F. McElroy.

TECHNICAL FIELD

The technical field to which this invention pertains is the art of fuel cells and particularly the art of hydrogen/halogen fuel cells. In particular it relates to the management of water during the operation of such fuel cells and humidification of a gas.

BACKGROUND OF THE INVENTION

Fuel cells operating on the principal of the electrochemical reaction of hydrogen and a halogen material by means of catalytic electrodes are well known in the art. The fuel cells 1 are of the conventional design (see FIG. 1) comprising a membrane and electrode assembly 2 having a solid polymer electrolyte membrane 3 positioned between and in contact with a catalytic anode electrode 5 on one surface of the membrane 6 and a catalytic cathode electrode 7 positioned on the opposite surface of the membrane 8. Additionally, electrically conductive current collectors 9 and 10 are also present in the anode and the cathode chambers respectfully to facilitate the transfer of electrons to the cathode which have been produced at the anode.

In a single cell configuration end plates 11 and 12 are placed about and away from the anode 5 and the cathode 7 thereby forming a chamber 13 between the end plate and the anode and a chamber 14 between the cathode and the end plate. The anode chamber 13 receives the fuel through inlet 15 and the cathode chamber receives the catholyte through inlet 16 and the fuel can exit the cell through outlet 17 while the catholyte exits through outlet 18 during operation of the cell.

The operation of these fuel cells traditionally comprises introducing hydrogen gas into the anode chamber where it comes in contact with the catalytic anode and through the half reaction 1 produces hydrogen ions and electrons.

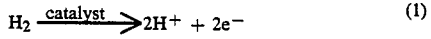

$$H_2 \xrightarrow{catalyst} 2H^+ + 2e^- \quad (1)$$

The electrons produced are gathered by the collector at the anode and transported to the cathode via an external circuit (or if a traditional bipolar collector is used the electrons are directed to a second cell cathode). The hydrogen ions produced at the anode are transported through the solid polymer electrolyte to the cathode side of the membrane.

At the cathode the catholyte is introduced into the cathode chamber. This catholyte contains the halogen material (bromine, chlorine or iodine) and is typically a solution of water and a halogenated compound such as hydrogen bromide, hydrogen chloride or hydrogen iodide. As the catholyte comes into contact with the catalytic cathode, it passes through the cathode chamber until it reaches the electrode/membrane/cathode interface 20 where it reacts with the hydrogen ions which have been transported through the membrane and the electrons from the anode in the presence of the catalyst thereby producing an acid. The cathodic reaction is shown in equation 2 below, for the halogen chlorine

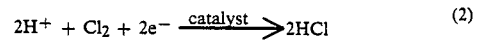

$$2H^+ + Cl_2 + 2e^- \xrightarrow{catalyst} 2HCl \quad (2)$$

One problem with these fuel cells is that the efficiency and performance deteriorates over time. It is thought that this is caused by the build-up of product acid at the cathode/electrolyte interface. It is felt that the acid concentration in these localized areas can become quite high. In the case of hydrochloric acid, it is thought that the concentration can exceed 7 molar HCl. Such a high concentration of acid at the interface may lead to a number of problems with the operation of the fuel cell such as increasing the ionic resistance of the membrane leading to voltage loss and accelerated voltage decay due to the local acid migrating to the anode and degrading the catalyst.

Ideally, the bulk catholyte introduced into the cathode chamber would be sufficient to dilute the acid produced at the interface. However, in order for the catholyte to dilute the acid it must first pass through the electrically conductive current collector/electrode support which is typically composed of porous plate of graphite/tantalum or multiple screens. These conductors provide a torturous path for the catholyte to pass through prior to reaching the cathode thereby severely limiting the flow of the bulk catholyte to the cathode and also limiting the ability of the catholyte to dilute the acid generated at the interface.

Therefore, what is required in this art is a method to reduce the build-up of the concentrated acid produced at the interface.

DESCRIPTION OF THE INVENTION

The present invention discloses a method for improving the operating condition of solid polymer electrolyte fuel cells which use hydrogen as the fuel and a halogen as the oxidant. The method comprises humidifying the hydrogen gas prior to its introduction into the anode chamber. The hydrogen is then reacted at the anode per equation 1 set forth above, and the hydrogen ions resulting from that reaction are then transported through the solid polymer electrolyte to the cathode where they react with the oxidant per equation 2 set forth in this disclosure. The water used to humidify the hydrogen prior to its introduction into the anode chamber is protonically pumped through the solid polymer electrolyte along with the hydrogen ions and exits the electrolyte at the electrolyte/cathode interface along with the hydrogen ions thereby diluting the resulting acid reaction product.

The foregoing and other features and advantages of the present invention will become more apparent from the following description and drawings.

BEST MODE FOR CARRYING OUT THE INVENTION

The present method may be practiced using a conventional fuel cell operating with a solid polymer electrolyte membrane and using hydrogen as the fuel and a halogen containing catholyte as the oxidant.

The present method comprises introducing hydrogen gas into the anode chamber of the fuel cell so that it contacts the catalytic surface and undergoes the reaction set forth in equation 1 above. The hydrogen ions produced are then transported through the electrolyte membrane to the cathode side. The electrons produced at the anode are collected at the current collector and directed to the cathode of an adjacent cell. Hydrogen gas is introduced into the fuel cell under pressure and maintained at pressure during operation by continuous in out of the hydrogen gas to maintain the pressure. As the fuel cell operates, the hydrogen gas is consumed on demand. The quantity of hydrogen consumed is directly proportional to the current produced by the fuel cell.

At the same time that the hydrogen is being introduced into the anode a catholyte solution containing a halogen reactant is introduced into the cathode chamber. As stated earlier these catholytes are typically solutions of a halogen dissolved in water. These are formed by bubbling a gas such as chlorine or by dissolving liquids such as bromine or iodine into the water and then directing the resulting catholyte into the cathode. The production of and the introduction of the catholyte is conventional.

The present invention comprises humidifying the hydrogen fuel prior to it being introduced into the anode chamber This results in water entering the anode chamber with the hydrogen. As the hydrogen is ionized and is transported across the electrolyte membrane, each hydrogen ion is capable of dragging with it between 2.5 and 3.5 molecules of water. Therefore, as the hydrogen ions pass through the membrane to the cathode they are taking with them the necessary water to dilute the resulting acid which is produced at the electrolyte/cathode interface.

The humidification of the hydrogen may be performed in any number of ways such as passing the hydrogen through a mist or stream of water, bubbling the hydrogen through water etc. However, it must be kept in mind that the anode is subject to flooding if too much water is introduced into the chamber. (Flooding being the condition where an excess of water coats the anode electrode preventing or inhibiting the ability of the hydrogen to pass through it and react at the anode/electrolyte interface and consequently reducing the performance of the cell). Typically, a water concentration of below about 3.5 moles of water per hydrogen ion should be maintained.

Figure 1:
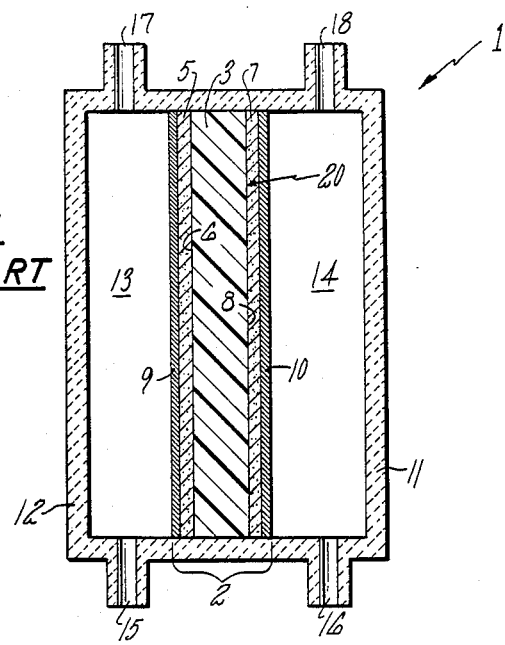
FIG. 1 is a drawing of a conventional fuel cell utilizing a solid polymer electrolyte useful in the present invention.
Figure 2:
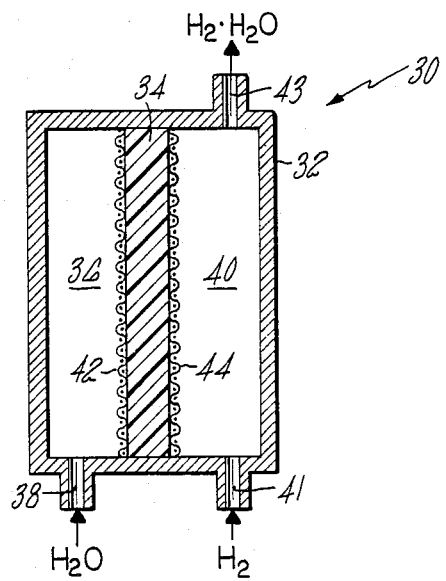
FIG. 2 is a cross-sectional view of a hydrogen humidifier useful in the present invention.

FIG. 2 is a cross-sectional view of a preferred humidification chamber for use in the present method. The chamber 30 comprises a housing 32 having a solid polymer membrane 34 positioned in the center to divide the chamber into two sections; a water section 36 into which water is introduced through inlet 38, and a hydrogen section 40 into which hydrogen is introduced to be humidified through inlet 41 and exits through outlet 43. In addition expanded metal screens 42 and 44 are positioned adjacent to the membrane surface in each section to support the membrane. The housing may be formed of conventional metal as are the screens. The polymer membrane must be capable of transporting water through the membrane to the hydrogen. Typical membranes may be those useful in the fuel cell itself such as perfluorosulfonic acid, perfluorosulfonic acid-polyethylene graft, perfluorocarboxylate, etc. The preferred material is Nafion ® available from DuPont de Nemours, E. I., Co. of Wilmington, Del. 19898. These membranes are generally 5 mils to about 12 mils in thickness, however, the preferred thickness is about 7 to about 10 mils.

The operation of the humidifier is as follows. Water is introduced into the water chamber 36 at a pressure which can range from atmospheric to several hundred pounds per square inch (psi). Hydrogen gas is introduced at a pressure equivalent to that of the fuel cell (15-60 psi absolute). The pressure differential between the hydrogen and the water compartments affects the transport of water across the membrane. Pressure effects are not exclusive since the amount of water transported through the membrane per unit time is also a function of temperature and membrane properties (formulation, thickness, temperature and water content).

The amount of water transported through the membrane per unit time is a function of the pressure and the thickness of the membrane so that by varying the pressure more or less water can be caused to pass through the membrane and therefore, the hydrogen is humidified to a greater or lesser extent. The preferred level of humidification is about 2.5 to about 3 moles of water per mole of $H^+$ produced in the anode of the cell.

The hydrogen is introduced into the hydrogen section under pressure. The pressure may vary with the fuel cell requirements but typically it will be at pressures in the range of 15 psig to about 100 psig. The hydrogen is directed to flow across the surface of the membrane thereby picking up the water on the surface of the membrane and carrying it to the anode of the fuel cell. Naturally the residency time of the hydrogen in the section will have an impact on the amount of water taken up by the hydrogen. Lengthy residence times will allow for complete saturation of the hydrogen. Typical flow rates will depend on the particular humidifier, membrane and fuel cell requirements but typically they will range from about 30 mls/min to about 1500 mls/min for 0.05 $ft^2$ hardware.

The apparatus for humidifying the hydrogen shown in FIG. 2 is only exemplary. These humidifiers may be designed as stand alone separate units such as that shown or it may be constructed as part of the fuel cell. Additionally, a humidifier having a plurality of sections for both water and hydrogen in the same unit is contemplated.

The humidified hydrogen is then introduced into the anode chamber where the hydrogen gas is reacted at the anode to produce hydrogen ions and electrons. Although not wanting to be bound by any particular theory of operation, applicants feel that the hydrogen ions pass through the solid polymer electrolyte to the cathode and during their migration, carry with them a number of molecules of water. The number of molecules of water carried through the electrolyte per hydrogen molecule is thought to be between 2.5 and 3.5. The water then emerges from the cathode side of the electrolyte to the catalytic/electrolyte interface where the hydrogen ions and the halogen molecules react to form the acid. The presence of the excess water dilutes the acid concentration in this area to a tolerable level thereby improving the operation of the fuel cell.

Figure 5:
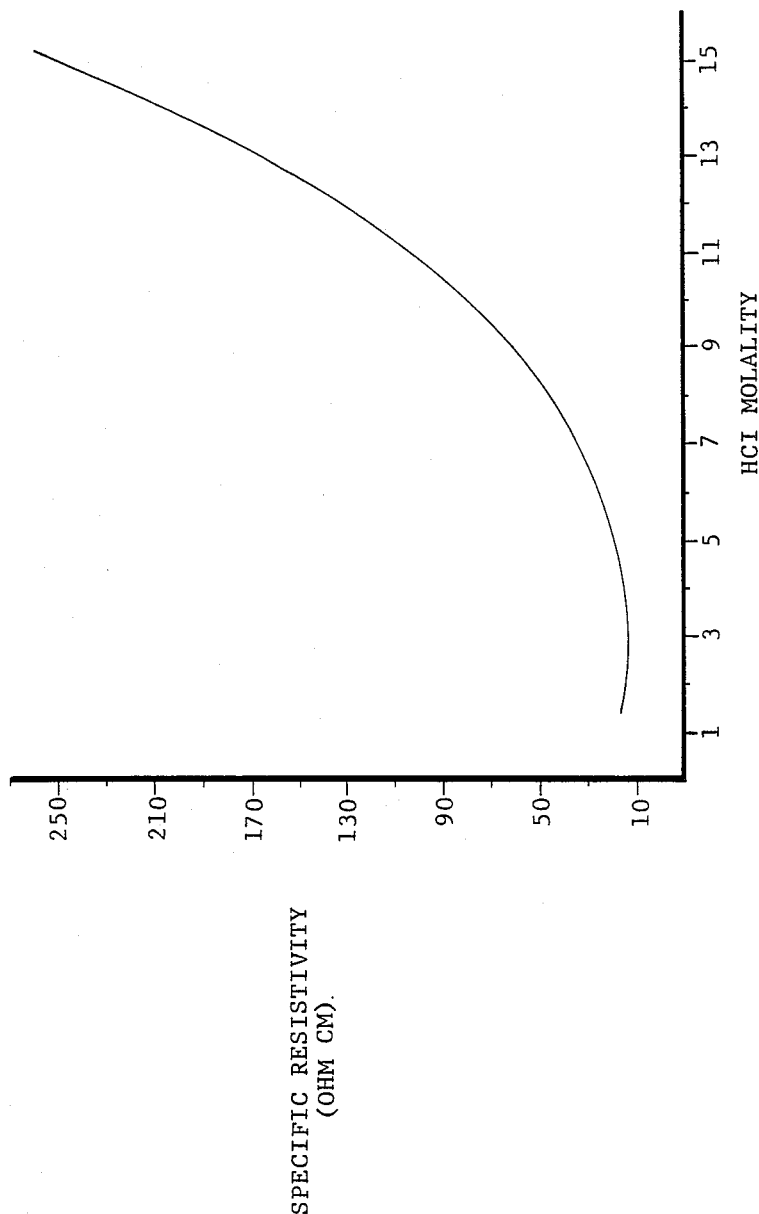
FIG. 5 is a graph depicting the increased resistivity of the electrolyte as acid concentration increases.

Typically, the acid concentration of the catholyte will be between about 0 moles/liter to about 6 moles/liter, however when the acid concentration increases above 7 moles/liter at the interface of the electrolyte membrane and the cathode the resistance increases and the efficiency of the fuel cell suffers. FIG. 5 demonstrates the effect an increase in acid concentration at the interface has on the specific resistivity of a Nafion 120 a solid polymer electrolyte. It is apparent that as the acidity rises in excess of about 7 Molar, the electrical resistivity of the polymer electrolyte increases markedly. However, as this acid at the interface increases in molarity, the amount of water drawn through or from the solid polymer electrolyte decreases. So this requires a molarity in the range of below about 6 to about 8 for optimum operation of the cell. Therefore, the amount of water introduced into the interface to dilute the acid is critical.

EXAMPLE

A fuel cell having an active cell area of 0.05 square feet was assembled. The solid polymer electrolyte membrane was formed of Nafion having a wet thickness of 9 mils. The catalytic anode was formed of a catalytic material of 70 percent by weight of platinum and 30 percent by weight gold. This catalyst was mixed with 25 percent by weight of Teflon ® and bonded to the membrane. While the cathode was formed of a platinum impregnated graphite sheet which was made hydrophobic by the introduction of Teflon powder onto the cathode. All of the components are conventional and known to one skilled in the art. The active area of the catalyst was 2.68 by 2.68 inches. The fuel cell had a pair of collector plates of graphite and polyvinylidene fluoride. The collector plates had distribution channels formed in their surfaces to distribute the hydrogen and the catholyte respectively across the anode and cathode surface. Again this structure is known in the art.

The hydrogen gas was passed through the gas humidifier (see FIG. 2) which comprised a housing which was divided into two chambers by a Nafion membrane having the dimensions of 3 inches in diameter in the active area and 9 mils thick. The membrane was supported by a pair of screens, one positioned on each side of the membrane. Water was introduced into one of the chambers under a pressure of 14.7 psia and this pressure was maintained throughout the experiment. The temperature of the water and the humidifier was 70° F.–80° F. Hydrogen was introduced into the opposite chamber of the humidifier at a pressure of 40 psig and a flow rate which is dependent on the current density at which the fuel cell operates and also the number of cells in the stack.

The catholyte was a solution of chlorine gas dissolved in water at a pressure of 40 psig wherein the concentration of the bulk catholyte was 3.0 M hydrochloric acid.

Figure 3:
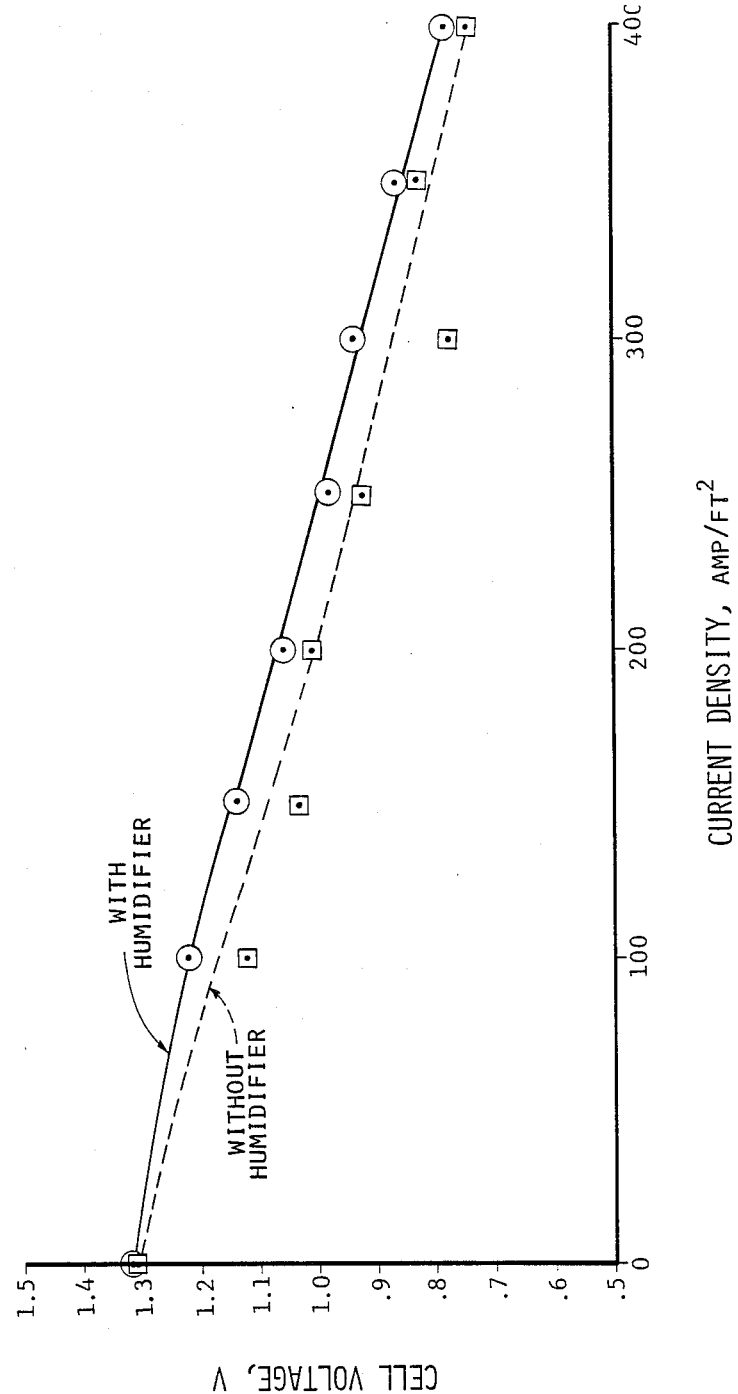
FIG. 3 is a graph depicting the comparative operating performance of the prior art and the present invention.
Figure 4:
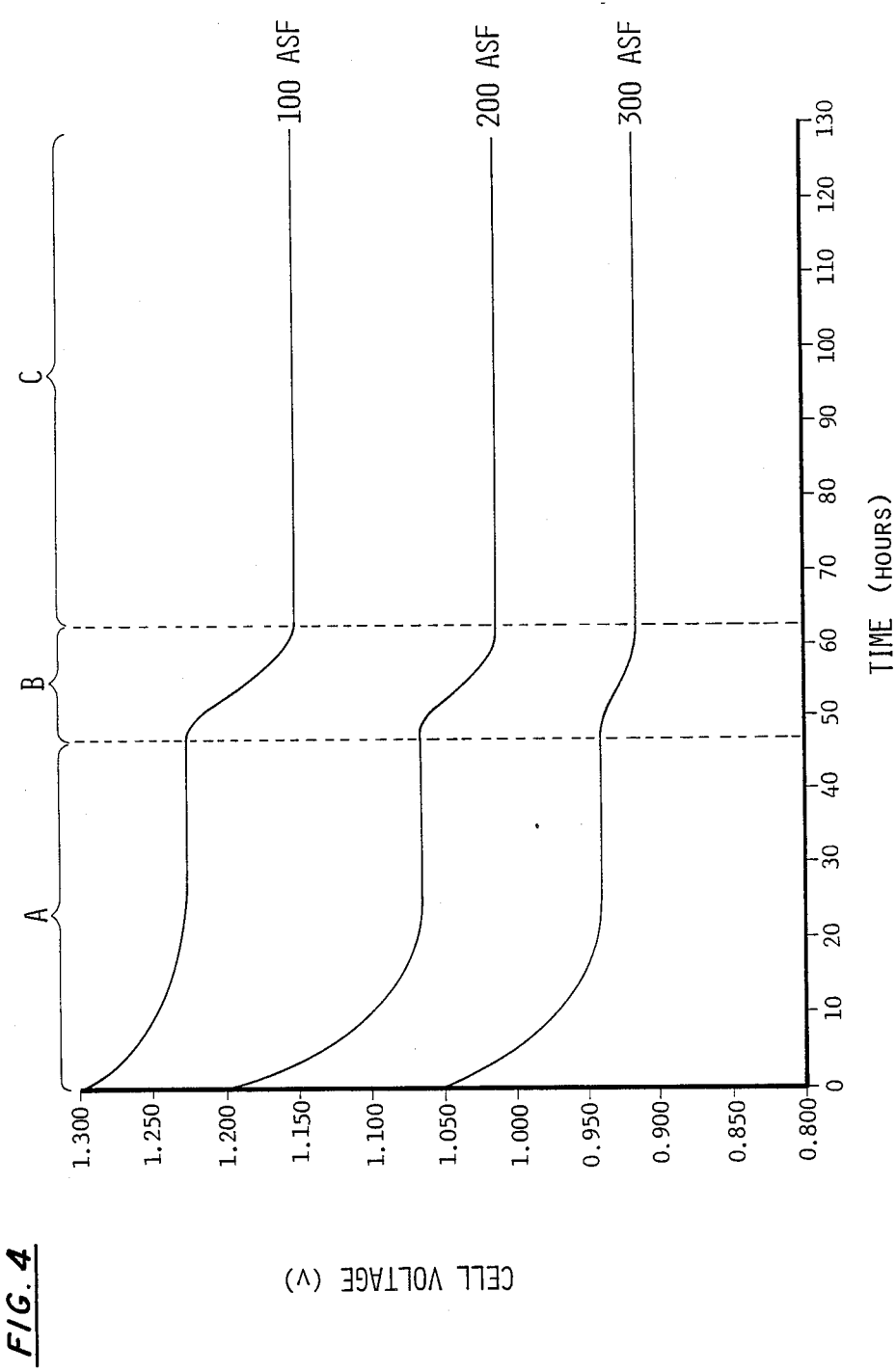
FIG. 4 is a graph depicting the operation of a fuel cell with intermittent humidification.

As may be seen from FIG. 3 in which the fuel cell was operated with and without humidification, the humidified hydrogen produced significant performance increase over the non-humidified hydrogen. In addition, the operation of the fuel cell did not show decline in cell voltage over time when the hydrogen was humidified. This is demonstrated in FIG. 4 in which the cell was operated for a time with humidification. Then the humidification was terminated for a time and the cell voltage started to fall dramatically. The fuel was then humidified again and the performance of the cell stabilized.

It is clear from the test data shown that there is a problem during the operation of the fuel cell using a halogen catholyte. Evidently the build-up of the reactant product acid adversely affects the performance of the cell over time. The introduction of water into the anode chamber with the fuel stabilizes the cell operation and eliminates this effect. The invention has been discussed in terms of a single fuel cell and a separate humidification structure, however, this disclosure contemplates incorporating the humidification structure integral with the fuel cell or a fuel cell stack having a plurality of fuel cells.

Although the invention has been shown and described with respect to detailed embodiments thereof, it will be understood by those skilled in the art that various changes in form and detail thereof may be made without departing from the spirit and scope of the invention.

I claim:

1. An improved method of operating a hydrogen/halogen fuel cell comprising
   a. introducing hydrogen fuel into the anode chamber of a fuel cell;
   b. introducing a halogen oxidant into the cathode chamber of a fuel cell;
   c. contacting said hydrogen fuel with the catalytic anode thereby catalytically disassociating the hydrogen into hydrogen ions and electrons;
   d. transporting the hydrogen ions through a solid polymer electrolyte membrane to the cathode electrode;
   e. passing the electrons through an external circuit to the cathode;
   f. reacting the oxidant with the hydrogen ions in the presence of the catalytic cathode to produce an acid;
   wherein the improvement comprises humidifying the hydrogen gas prior to its introduction into the anode chamber thereby providing excess water which maybe protonically pumped through the solid polymer electrolyte membrane with the hydrogen ions to the cathode and thereby diluting the acid produced at the cathode.

2. The method of claim 2 wherein the hydrogen gas is humidified by passing the gas over the surface of a solid polymer electrolyte membrane whose opposite surface is in contact with liquid water.

3. The method of claim 3 wherein the water contacting the solid polymer electrolyte is under pressure.

4. The method of claim 2 wherein the solid polymer electrolyte membrane is a fluoropolymer.

* * * * *